United States Patent [19]

Murata et al.

[11] Patent Number: 4,929,866
[45] Date of Patent: May 29, 1990

[54] LIGHT EMITTING DIODE LAMP

[75] Inventors: Hiroaki Murata; Teruhisa Inomata; Masatoshi Tabira, all of Itamishi, Japan

[73] Assignee: Mitsubishi Cable Industries, Ltd., Amagasaki, Japan

[21] Appl. No.: 267,852

[22] Filed: Nov. 7, 1988

[30] Foreign Application Priority Data

Nov. 17, 1987 [JP] Japan .............................. 62-290139
Dec. 29, 1987 [JP] Japan .............................. 62-336314

[51] Int. Cl.$^5$ .......................... H01J 5/16; G09F 13/18
[52] U.S. Cl. ..................................... 313/500; 313/113;
313/116; 362/297; 362/310; 362/362
[58] Field of Search ............... 313/113, 498, 499, 500,
313/512, 116; 362/296, 297, 310, 341, 362, 367

[56] References Cited

U.S. PATENT DOCUMENTS 4,009,394  2/1977  Mierzwinski .................. 313/512 X
4,642,513  2/1987  Nyul et al. ..................... 313/498 X

FOREIGN PATENT DOCUMENTS 62-109003  5/1987  Japan .
62-125285  8/1987  Japan .
62-176887  11/1987  Japan .

Primary Examiner—Kenneth Wieder
Attorney, Agent, or Firm—Armstrong, Nikaido, Marmelstein, Kubovcik & Murray

[57] ABSTRACT

It is disclosed a light emitting diode lamp composing a window through which light is released forwardly, a plurality of light emitting diodes located at a corner of the window or behind the frame of the window, and a light reflector having a plurality of light reflecting faces whereby light emitted from the light emitting diodes is reflected toward the window. The lamp is suited as an automobile lamp, especially as a tail lamp.

7 Claims, 4 Drawing Sheets

LIGHT EMITTING DIODE LAMP

BACKGROUND OF THE INVENTION

1. Field of the Invention

The present invention relates to a lamp having light emitting diodes as light source, and suited for use as an automobile lamp, a room lamp of hotel or house, a night signal, especially a tail lamp of an automobile.

2. Prior Art of the Invention

There has been used a tail lamp of automobile which has a filament as a light source. However, the tail lamp of filament type has many shortcomings, such as consuming too much electric power, generating a great amount of heat, employing a readily snapping filament, and the lamp per se being large and heavy or the like.

In order to overcome these problems, it has been proposed that instead of the filament lamp, a light emitting diode lamp is adopted, which has such a structure that a plurality of light emitting diodes are mounted on an insulating board. The proposal may overcome the above problems on the conventional filament lamp, because light emitting diodes emit light by a lower voltage and current than those of filament lamp, and also is small and light, and seldom include problem of snapping, thus realizing low electric power consumption, low heat generation, substantially no snapping to be able to use semipermanently, small size, and light weight.

However in this proposal there has been the following new problem; that is, tail lamps of automobiles have in general a wider window through which light from its light source is released forward, and it is required that the light released from the window is neither too strong nor too weak, or should be moderate, and also is released as even as possible all over the window. When the window is filled up with light emitting diodes in order to achieve even lighting, the lighting power becomes too strong to fail as a tail lamp of automobile. On the other hand, when using a small number of light emitting diodes in order to make power moderate, the lighting becomes spot-like, and therefore it does not obtain a lamp which illuminates evenly.

OBJECT OF THE INVENTION

An object of the present invention is to provide a novel lamp having light emitting diodes as light source.

Another object of the present invention is to provide a light emitting diode lamp which is able to lighten as even or uniform as possible all over its window with a moderate lighting power.

Further another object of the present invention is to provide a light emitting diode lamp being used as a tail lamp of automobiles.

SUMMARY OF THE INVENTION

Stated more specifically, the present invention provides a light emitting diode lamp comprising a window through which light is released forward (hereinafter the window is referred to as light-releasing window, or simply window), a plurality of light emitting diodes located at a corner of the window or behind the frame of the window, and a light reflector having a plurality of light reflecting faces whereby light emitted from the light emitting diodes is reflected toward the window.

DETAILED DESCRIPTION OF THE INVENTION

Although a plurality of light emitting diodes are used as light source in the present invention, all of these are located at a corner or corners of the light releasing window thereof or behind the frame of the window. Therefore, besides a possible part of the light emitted from the diodes going directly toward the window, a large portion of the light emitted from the diodes are caught in finely divided or distributed condition by a plurality of light reflecting faces of the light reflector to be reflected thereby toward the window. As a result, the light released forward through the window consists of a possible portion which is directly caught by the window and a majority of reflected portion in a finely divided condition, thus achieving to release light as even or uniform as possible from all the area of the window under the situation of using a minimum number of light emitting diodes whose total lighting power falls in a range suited, for example, for a tail lamp of automobiles.

Furthermore, the lamp of the present invention may be reduced its total thickness so thin as from about 20 to about 60 mm by using a thinner light reflector. Such a thinner lamp in total thickness is so expedient, in comparison with a conventional filament lamp, that it is suitable as an automobile lamp, especially as a tail lamp for not requiring large space and for easy mounting in an automobile.

Now the present invention will be explained in detail by relying on Figures. In FIGS. from 1 to 8, the same parts are exhibited by the same numeral or symbol.

Figure 1:
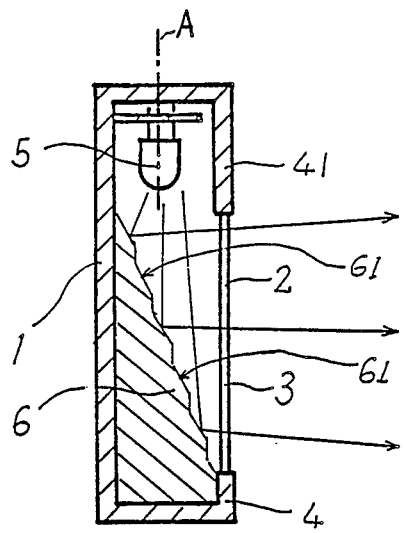
FIG. 1 is a cross-sectional view of an embodiment of the present invention.
Figure 2:
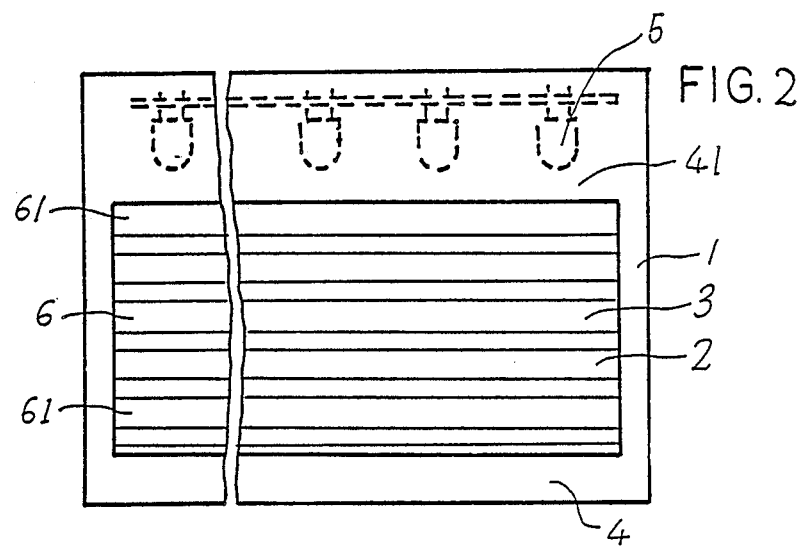
FIG. 2 is a front view of FIG. 1.

In an embodiment of FIGS. 1 and 2 numeral 1 exhibits a lamp case made of a metal or a plastic, numeral 2 exhibits a light releasing window formed at a front wall of the lamp case 1, numeral 3 exhibits a window pane fit at the window 2, numeral 4 exhibits a frame whereby the window 2 is formed, and includes an upper frame portion 41 and a lower frame portion 42, numeral 5 exhibits light emitting diodes located behind the upper frame portion 41 of the frame 4, numeral 6 exhibits a light reflector having a plurality of reflecting faces 61.

As the light emitting diode 5 to be used in the present invention, suitable is a conventional resin molded one wherein a chip of light emitting diode, such as a homo-junction type, a single hetero-junction type, a double-hetero junction type, etc., is mounted on the bottom surface of a small light reflecting cap provided with a lead frame, and is molded with a transparent organic polymer, such as epoxy resin. There is no limitation concerning color of light emitted. For example, red light is suited for a stop lamp, tail lamp, etc. of automobile, yellow light is for a map lamp of automobile and turn signal lamp, green light is for green signal lamp, etc.

A small number of light emitting diodes having high lighting power or conversely, a large number of light emitting diodes having rather low lighting power may be used in the present invention. As a chip of light emitting diode having high lighting power, it is preferable these described in the specification of Japanese patent application Sho 61-92895, which are double hetero structure having from $10^{15}$ to $10^{20}$ number of atoms/cm$^3$ in concentration of impurity in the active layer thereof. The light emitting diode can emit stronger light than conventional diodes under applying an ordinary voltage to allow to apply more lower voltage, as a result generating fewer heat than the case of conventional diodes during operation. They are stable in quality, and may be easily mass-produced in low cost.

Each of the reflecting faces 61 is so inclined that the light emitted from the light emitting diodes 5 is reflected thereby toward the window 5. Because the diodes 5 are located behind the upper frame portion 41, the light emitted therefrom does not go toward the window 2 directly, but are caught and reflected by means of the reflecting faces 61 to go toward the window 2 as seen in FIG. 1. Therefore the light emitted from one diode 5 is reflected by all of the reflecting faces 61 in finely divided condition. As a result, each reflecting face 61 behaves as if a light source, realizing the window releasing light substantially evenly from all the area thereof.

Differing from the case of embodiment shown in FIGS. 1 and 2, in the present invention a part of the light from the light emitting diodes 5 may be caught directly by the window 2 and released therethrough forward, if the diodes 5 are located not at the center or its vicinity of the window 2, but at a corner or corners of the window 2. In such location of the diodes 5 the light released from the window 2 become also substantially even so as to satisfy various standards, for example, S A E(Society of Automotive Engineers) standard, because of the following reason: that is, by locating the diodes at a corner or corners of the window 2 there is, besides the direct light, a great amount of light which is caught and reflected by the reflecting faces 61, and the direct light is diluted by the reflected light from the reflecting faces 61.

Setting aside the above mentioned modified embodiment, in order to obtain even illumination it is preferable that the light emitting diodes are so located that at least ⅓, especially at least ½ of the light therefrom can not observe directly from outside of the window 2. This may realize, for example, by a manner wherein a resin molded light emitting diodes is so installed that at least a part of the total length of the resin mold portion which includes a chip of diode is behind the frame 4.

Though the light releasing window 2 may be free from any pane, it is preferable to have a window pane 3 as shown in FIG. 1 from various views, such as preventing from moisture, dust and like, or for fine view etc. The window pane 3 may be a simple transparent plate composed of a material such as polycarbonate, acryl resin, epoxy resin, polypropylene, nylon, polychlorotrifluoroethylene, ethylene-tetrafluoroethylene-copolymer, polyvinylidene chloride, fluorinated ethylene-propylene-copolymer, polyethylene telephthalete, and like transparent organic polymer, and soda glass, silica glass and like glasses. More preferable as the window pane 3 is a light-scatterable plate in order to make more even the reflected light from the above mentioned reflecting faces 61. As a light-scatterable plate a variety of plates are employable, if they are able to scatter the reflected light from the reflecting faces 61 and release it out of the window 2. For example, what can be used is a plate made of a transparent organic or inorganic material including powder of at least one other transparent organic or inorganic material in well dispersed state, a transparent plate including suitable amount of fine voids or, a transparent plate having a plurality of convex lenses, concave lenses, or projections of complex forms at one side or both sides thereof.

The light reflector 6 may be made of a plastic or a metal, and the reflecting faces 61, if necessary in order to improve their light reflecting efficiency, are finished by applying thereon a grossy plate or vapor deposition of a metal. More simply and easily, the reflecting faces 61 may also be finished by only sraying a paint mixed with fine powder of a metal. As a metal of those above mentioned, it is exemplified nickel, cromium, aluminum, gold, silver, etc.

In the case where the light emitting diodes 5 are so set that the direction of their center axes A of light emission become parallel to the window 2 as seen in FIG. 1, the inclination angle (the angle against the above center axises A of light emission of the diode 5) of each reflecting face 61 may be, for example, around 45 degrees. Desired results may also be obtained by the following other embodiments concerning the inclination angle of reflecting face 61. In a certain case, the inclination angle of the reflecting face 61 closest to the light emitting diodes 5 is around 20 degrees, and becoming gradually greater further away from the diodes 5, the angle of the reflecting face farthest to the diodes 5 is around 60 degrees. In another case in contrast with the above, the angle of the reflecting face closest to the diodes 5 is around 60 degrees, and becoming gradually smaller further away from the diodes 5, the angle of the reflecting surface farthest to the light emitting diodes 5 is around 20 degrees. In yet another case, the angles of reflecting faces 61 do not change gradually, but change at random or are made uniform.

Though the maximum thickness of the light reflector 6, which is usually equal to the distance between inner surfaces of the case 1 is varied according to usage of the present lamp, it is, for example, from about 10 to about 60 mm, preferably from about 15 to about 50 mm, when used as a tail lamp of an automobile.

A certain concrete design of the embodiment of FIG. 1 is shown below.

A case 400 mm in length, 150 mm in height, and 30 mm in thickness has a light releasing window at one wall thereof. The window, which is formed by an upper frame portion 10 mm in width and a under frame portion 10 mm in width and therefore is 400 mm in length and 130 mm in height, is fitted with a pane made of transparent polycarbonate and having a plurality of convex lenses on its one surface. Twenty resin-molded light emitting diodes are mounted on the center of the bottom inner-surface of the case with an uniform distance to render their center axes of light vertical against the bottom inner-surface. The individual resin-molded light emitting diode comprises a chip of light emitting diode of 350 μm square having a double-hetero structure which is mounted on the bottom surface of a light reflecting cap provided with a lead frame, and is molded with a transparent epoxy resin, and is 12 mm in molding resin length, 2000 millicandela in lighting power, and 5 degrees in half angle. Each resin-molded light emitting diode is so mounted on the bottom inner-surface of the case that the top portion, about 2.5 mm, of the molding resin length thereof takes a position higher than the level of the upper edge of the under frame portion. The case is provided therein with a light reflector which is 20 mm in the maximum thickness, and has twenty step-wise reflecting faces. The inclination angle (the angle against the center axis A of the light emission of the resin molded light emitting diode) of the reflecting face closest to (about 5 mm) the diodes is 40 degrees, and becoming gradually greater further away from the diodes, the angle of the reflecting face farthest to (about 130 mm) the diodes is 50 degrees. This embodiment is excellent in evenness of lighting and moderate in lighting power to satisfy, as a tail lamp of automobile, the S A E standard.

Figure 3:
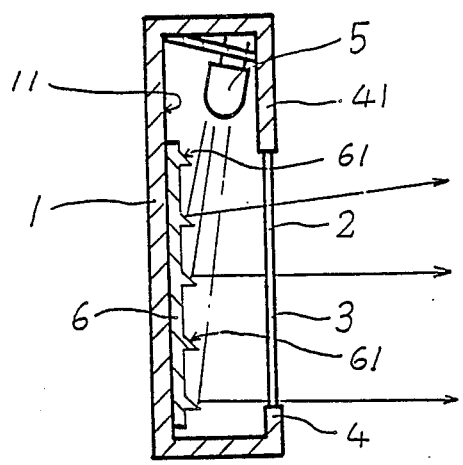
FIG. 3 is a cross-sectional view of another embodiment of the present invention.

In the embodiment shown in FIG. 3, the light emitting diodes 5 are mounted behind the upper frame portion 41 to be able to emit light toward the inner wall 11 of the case 1, and a light reflector 6 provided with reflecting faces 61 having a saw-like structure in cross-section is set on the inner wall 11.

Figure 4:
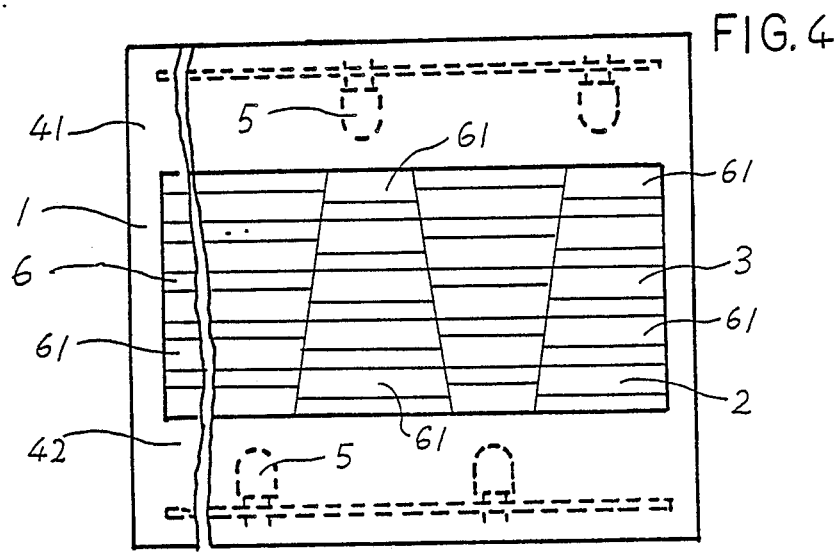
FIG. 4 is a front view of further another embodiment of the present invention.

In the embodiment shown in FIG. 4, the light emitting diodes 5 are mounted behind the upper frame portion 41 and the under frame portion 42 separetely as seen in FIG. 4, and a light reflector 6 is provided with two groups of reflecting faces participating with each group of the light emitting diodes 5 respectively to reflect light toward the window 2.

The light reflector 6 used in each embodiment shown in FIGS. 5 to 8, is made of a transparent material such as an organic polymer, glass etc. mentioned before and has reflecting faces 61 on its tail surface 62, and also the head surface 63, which is fitted into its light releasing window 2 and has convex lenses 64. The head surface 63 functions to scatter the reflected light from the reflecting faces 61 by the action of convex lenses 64. The embodiments of FIGS. 5 to 8 are advantageous for their commercial production with low cost due to the employment of the above-mentioned light reflector 6 which serves both as a light scattering means and as a pane of the window 6.

Figure 5:
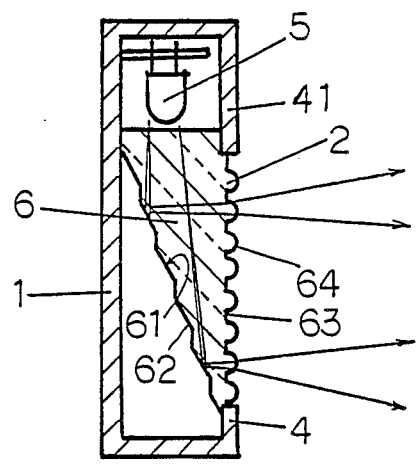
FIG. 5 is a cross-sectional view of further another embodiment of the present invention.
Figure 6:
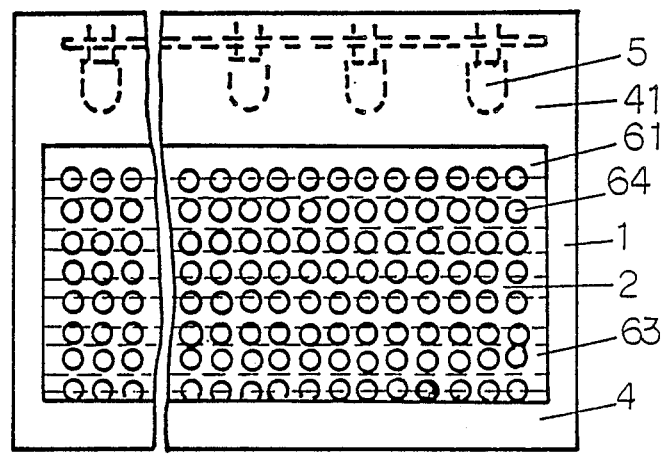
FIG. 6 is a front view of FIG. 5.

In the embodiment shown in FIGS. 5 and 6 the light emitting diodes 5 are located behind the upper frame portion 41 of the window 2. A light reflector 6 has step-wise reflecting faces 61 on the tail surface 62 thereof, and also has convex lenses 64 regularly formed on its head surface 63 which is fitted into the window 2. The light reflector 6 is a right-angled triangle in cross section as a whole, and may be prepared by first molding a preform thereof having a right-angled triangle in cross section and a stair on its tail surface, and then by applying on the tail surface a grossy plate or vapor deposition of a metal, or by spraying a paint mixed with fine powder of a metal.

Figure 7:
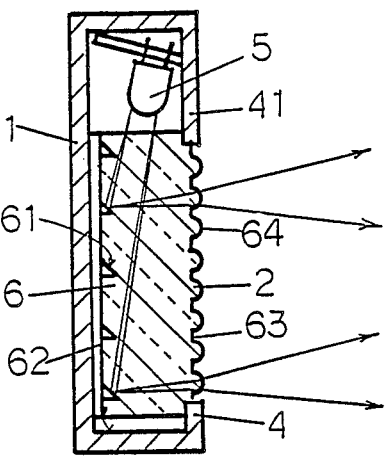
FIG. 7 is a cross-sectional view of further another embodiment of the present invention.

In the embodiment shown in FIG. 7, the light emitting diodes 5 are mounted behind the upper frame portion 41 to be able to emit light toward the inner wall 11 of the case 1, as similar to the embodiment of FIG. 3. A light reflector 6 has light reflecting faces 61 of saw-like structure in cross-section on the tail surface 62 which is parallel to the inner wall 11 of the case 1. The light reflector 6 is a rectangular form in cross-section as a whole.

Figure 8:
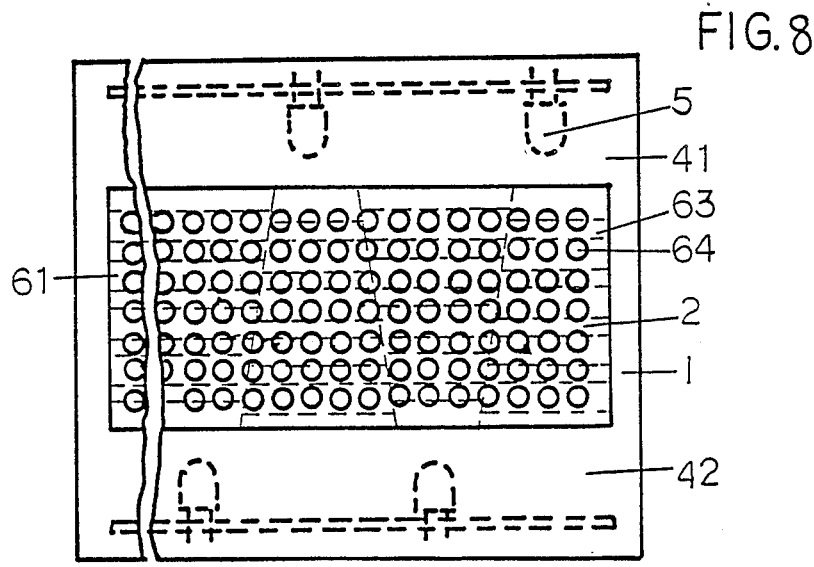
FIG. 8 is a front view of further another embodiment of the present invention.

In the embodiment shown in FIG. 8, the light emitting diodes 5 are mounted behind the upper frame portion 41 and the under frame portion 42 separetely as seen in FIG. 4, and a light reflector 6 is provided with two groups of reflecting faces participating with each group of the light emitting diodes 5 respectively to reflect light toward the window 2.

The present invention may include a variety of modified embodiments. The position and inclination angle etc. of each reflecting face of a light reflector may be so designed as to be able to reflect effectively light toward the light releasing window according to the set position and center axes A of light emission of light emitting diodes. Furthermore, each reflecting face of the light reflector may be flat, convex, concave, and also may includes two or more faces.

The light emitting diodes may be located separately not only the top and/or bottom of the light releasing window, but also the right and/or left, or all round of the window. A convex lens may be positioned in front of each light emitting diode to collect the light from the diode and to send out toward the light reflector.

As described above, the light reflectors 6 used in the embodiments of FIGS. 5 to 8 have two functions of reflection by the action of the reflecting faces 61 and scattering the reflected light by the action of convex lenses 64 to make even the light released forward from the light releasing window 2. Instead of the reflectors 6, a variety of modified reflectors may also be employed. For example, those having concave lenses, both of covex lenses and concave lenses, or projections and/or cavities of complex forms, on their head surfaces which are fitted into the window 2, or those which, though having a flat head surface, per se are constructed with a light-scatterable material, such as a mixture composed of a transparent organic or inorganic material including powder of at least one other transparent organic or inorganic material in a well dispersed state, a transparent organic or inorganic material including suitable amount of fine voids.

EFFECT OF THE INVENTION

Various problems encountered in conventional filament lamps, such as consumtion of much energy, high heat generation, snapping of filament, big size and heavy weight of lamp itself, are solved by the lamp of the present invention with the use of light emitting diodes as lighting source.

On the other hand, though there is a problem of lighting becoming spot-like, when using a small number of light emitting diodes in order to obtain moderate lighting power, the problem are overcome by the present invention to realize even illumination from all the light releasing window with the use of a specific light reflector.

Furthermore, the lamp of the present invention may be reduced its total thickness so thin as from about 20 to about 60 mm by using a thinner light reflector. Such a thinner lamp is so advantageous, in comparison with a conventional filament lamp, and is suitable as an automobile lamp, especially, as a tail lamp, for not receiving large space and is easy for mounting in an automobile.

While the invention has been particularly shown and described in reference to preferred embodiments thereof, it will be understood by those skilled in the art that changes in form and details may be made therein without departing from the spirit and scope of the invention.

What is claimed is:

1. A light emitting diode lamp comprising: a case;
a plurality of light emitting diodes disposed within said case;
a window forming a part of said case and having at least one window frame, said window allowing light emitted from said plurality of light emitting diodes to pass therethrough, said plurality of light emitting diodes being secured at a corner of said window and behind said window frame;
light reflector means having a plurality of light reflecting faces for dividing and reflecting said light from said plurality of light emitting diodes, and
light-scattering means for scattering said light from said light reflector means to thereby have said light substantially uniformly pass through said window.

2. A light emitting diode lamp as defined in claim 1, wherein said case has said light reflector on an inner surface opposite said window.

3. A light emitting diode lamp as defined in claim 1, wherein said light reflector has a plurality of stepped light reflecting faces.

4. A light emitting diode lamp as defined in claim 1, wherein said light reflector has a plurality of light reflecting faces which are saw-like structures in cross-section.

5. A light emitting diode lamp as defined in claim 2, wherein the light emitting diodes are separately located behind said upper and lower frames of said window.

6. A light emitting diode lamp as defined in claim 2, wherein said light reflector comprises a transparent material, and has a plurality of reflecting faces on a first end surface and a second end surface positioned in said window.

7. A light emitting diode lamp as defined in claim 2, wherein said lamp is for use as a tail lamp of an automobile.

* * * * *